(12) United States Patent
Vitali et al.

(10) Patent No.: US 9,632,515 B2
(45) Date of Patent: Apr. 25, 2017

(54) PRESSURE STABILIZING MECHANISM AND HYDRAULIC PUMP EQUIPPED THEREWITH

(71) Applicant: MS GREGSON, Drummondville (CA)

(72) Inventors: Mario Vitali, Drummondville (CA); Guy Martel, St-Lucien (CA)

(73) Assignee: MS Gregson Inc., Drummondville (CA)

( * ) Notice: Subject to any disclaimer, the term of this patent is extended or adjusted under 35 U.S.C. 154(b) by 104 days.

(21) Appl. No.: 14/108,251

(22) Filed: Dec. 16, 2013

(65) Prior Publication Data

US 2015/0114483 A1    Apr. 30, 2015

Related U.S. Application Data

(60) Provisional application No. 61/895,319, filed on Oct. 24, 2013.

(51) Int. Cl.
| | |
|---|---|
| *F16K 31/12* | (2006.01) |
| *G05D 16/16* | (2006.01) |
| *F04B 11/00* | (2006.01) |
| *F04B 49/24* | (2006.01) |
| *F16L 55/04* | (2006.01) |

(52) U.S. Cl.
CPC ........ *G05D 16/166* (2013.01); *F04B 11/0025* (2013.01); *F04B 49/24* (2013.01); *F16L 55/04* (2013.01); *Y10T 137/2516* (2015.04)

(58) Field of Classification Search
CPC ... F16K 15/02; G05D 16/10; Y10T 137/7801; Y10T 137/7812; Y10T 137/7925
USPC ...... 137/470, 472, 494, 528, 99; 251/50, 52; 417/307
See application file for complete search history.

(56) References Cited

U.S. PATENT DOCUMENTS

| | | | | |
|---|---|---|---|---|
| 608,345 | A | * | 8/1898 | Rettew et al. ................ 137/494 |
| 683,388 | A | * | 9/1901 | Curtis ............................ 137/494 |
| 1,173,518 | A | * | 2/1916 | Hoxsie .......................... 137/494 |
| 1,849,702 | A | * | 3/1932 | Bard ............................. 137/113 |

(Continued)

FOREIGN PATENT DOCUMENTS

GB      2383113 A      6/2003

*Primary Examiner* — R. K. Arundale
(74) *Attorney, Agent, or Firm* — IP Delta Plus Inc.

(57) ABSTRACT

The present invention relates to pressure stabilizing mechanism and to a hydraulic pump including the pressure stabilizing mechanism. The pressure stabilizing mechanism comprises a frame, a piston and a first and second seals. The frame defines a piston chamber, a lower-pressure circuit and a higher-pressure inlet. The piston chamber has a first section of smaller circumference and a second section of larger circumference. The first section of the piston chamber connects the lower-pressure circuit and the higher-pressure inlet. The lower-pressure circuit further connects with the second section of the piston chamber. The lower-pressure circuit receives a fluid at a lower pressure and the higher-pressure inlet receives the fluid at a higher pressure. The piston is slidably movable in the piston chamber between an open position and a closed position. The piston slidably moves between the closed and open position upon relative variation between the lower-pressure fluid and larger surface in the second chamber with respect to the higher-pressure fluid and smaller surface in the first chamber of the piston chamber.

9 Claims, 7 Drawing Sheets

(56) References Cited

U.S. PATENT DOCUMENTS 4,182,354 A     1/1980  Bergstedt
4,480,653 A  *  11/1984 Vanderburg ................. 137/112
7,234,486 B2 *  6/2007  Ressel ................ F02M 63/0215
                                                   137/469

* cited by examiner

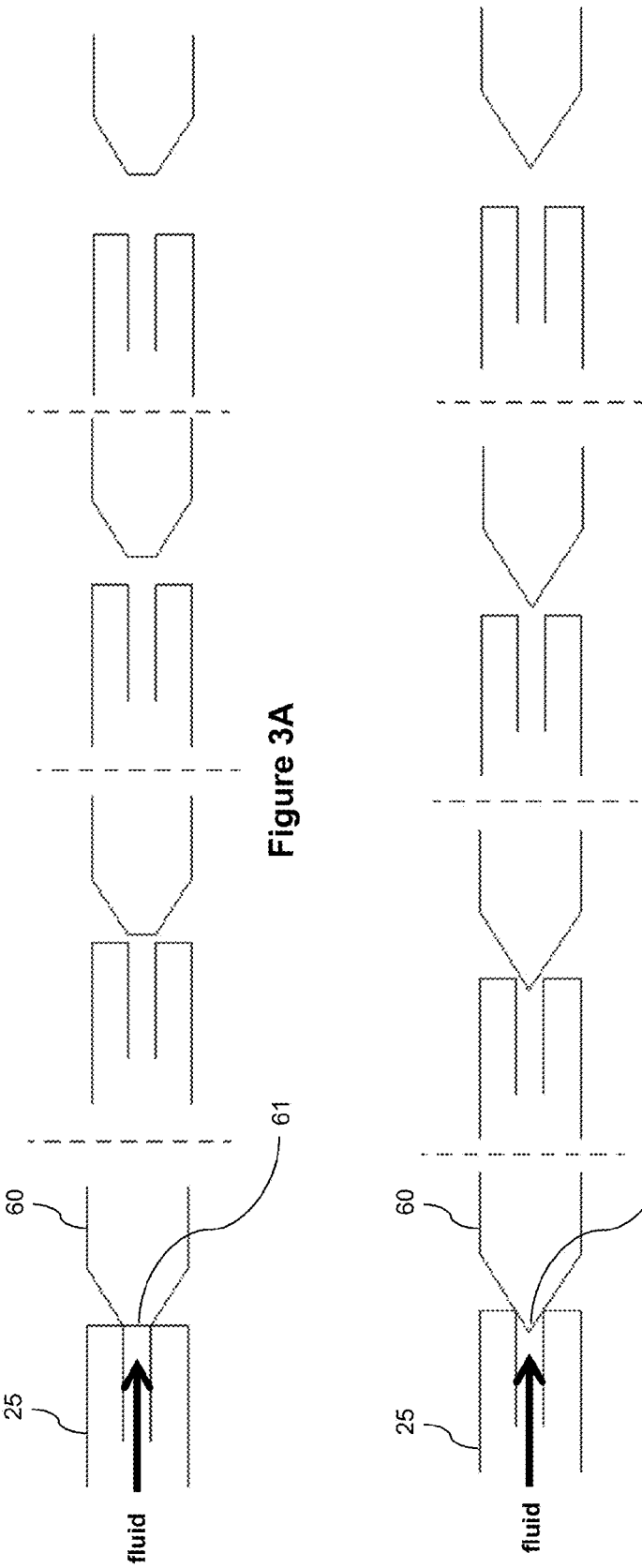

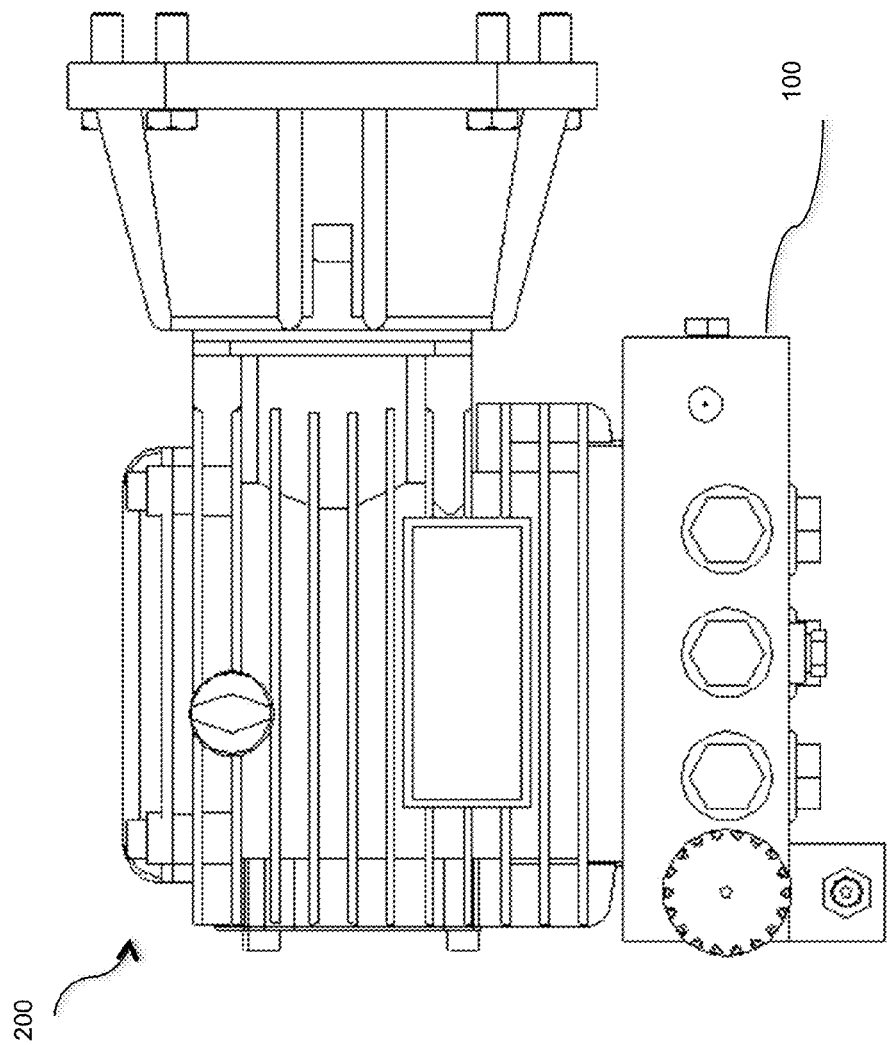

PRESSURE STABILIZING MECHANISM AND HYDRAULIC PUMP EQUIPPED THEREWITH

TECHNICAL FIELD

The present system relates to the field of fluid pressure stabilizing, and more particularly to a pressure stabilizing mechanism and hydraulic pump equipped therewith.

BACKGROUND

One of the problems in hydraulic pumps often relates to premature wear caused by cavitation. Cavitation occurs when a liquid is subject to rapid changes of pressure, causing formation of 'cavities' or 'air bubbles' within the liquid. The bubbles can then implode, causing an erosion of metal parts of the pump. Cavitation is often accompanied by vibration and noise, which are unwanted side effects.

A pump is a system for sucking and discharging a fluid. The main characteristics of a pump are its debit and its pressure (during suction and discharge). Cavitation occurs in a pump when during suction, the available debit is lower than the debit required by the pump. For example, for a pump requiring a debit of three Gallons Per Minute (GPM) at suction, if only two GPM are available, then cavitation occurs. Conversely, if three or more GPM are available at suction, there is no cavitation. To avoid cavitation, the absolute pressure at suction shall be greater than the required Net Positive Suction Head (NPSH). NPSH value is usually supplied by manufacturers of hydraulic pumps.

However, it is not always possible to ensure that the available debit will not suddenly drop of fluctuate during functioning of the pump. There is therefore a need for a mechanism for reducing impacts of available fluid pressure variation of a hydraulic pump.

SUMMARY

The present mechanism relates to a pressure stabilizing mechanism for a hydraulic pump. The pressure stabilizing mechanism comprising a frame, a piston, a first and a second seal. The frame defines a piston chamber, a lower-pressure circuit and a higher-pressure inlet. The piston chamber has a first section of smaller circumference and a second section of larger circumference. The first section of the piston chamber connects the lower-pressure circuit and the higher-pressure inlet. The lower-pressure circuit further connects with the second section of the piston chamber. The lower-pressure circuit receives a fluid at a lower pressure and the higher-pressure inlet receives the fluid at a higher pressure. The piston slidably moves in the piston chamber between an open position and a closed position. The piston has a first portion of smaller circumference and a second portion of larger circumference. A length of the first portion of the piston slidably moves in the first section of the piston chamber, while the second portion of the piston slidably moves in the second section of the piston chamber. The piston defines at an end of the first portion opposite to the second portion a tip. When the piston is in a closed position, the tip fully closes the higher-pressure inlet, and when the piston is in an open position, the tip opens the higher-pressure inlet. The piston slidably moves between the closed and open position upon relative variation between the lower-pressure fluid and larger surface in the second chamber with respect to the higher-pressure fluid and smaller surface in the first chamber of the piston chamber. The first seal seals the first portion of the piston in the first section of the piston chamber while allowing movement between the open and closed position. The second seal seals the second portion of the piston in the second section of the piston chamber while allowing movement between the open and closed position.

BRIEF DESCRIPTION OF THE DRAWINGS

In the appended drawings:

FIGS. 3A and 3B illustrate two different shapes of piston tip used in the pressure stabilizing mechanism of FIGS. 1A-D; and FIG. 4 illustrates a schematic example of the pressure stabilizing mechanism connected to a pump.

DETAILED DESCRIPTION

Figure 1A:
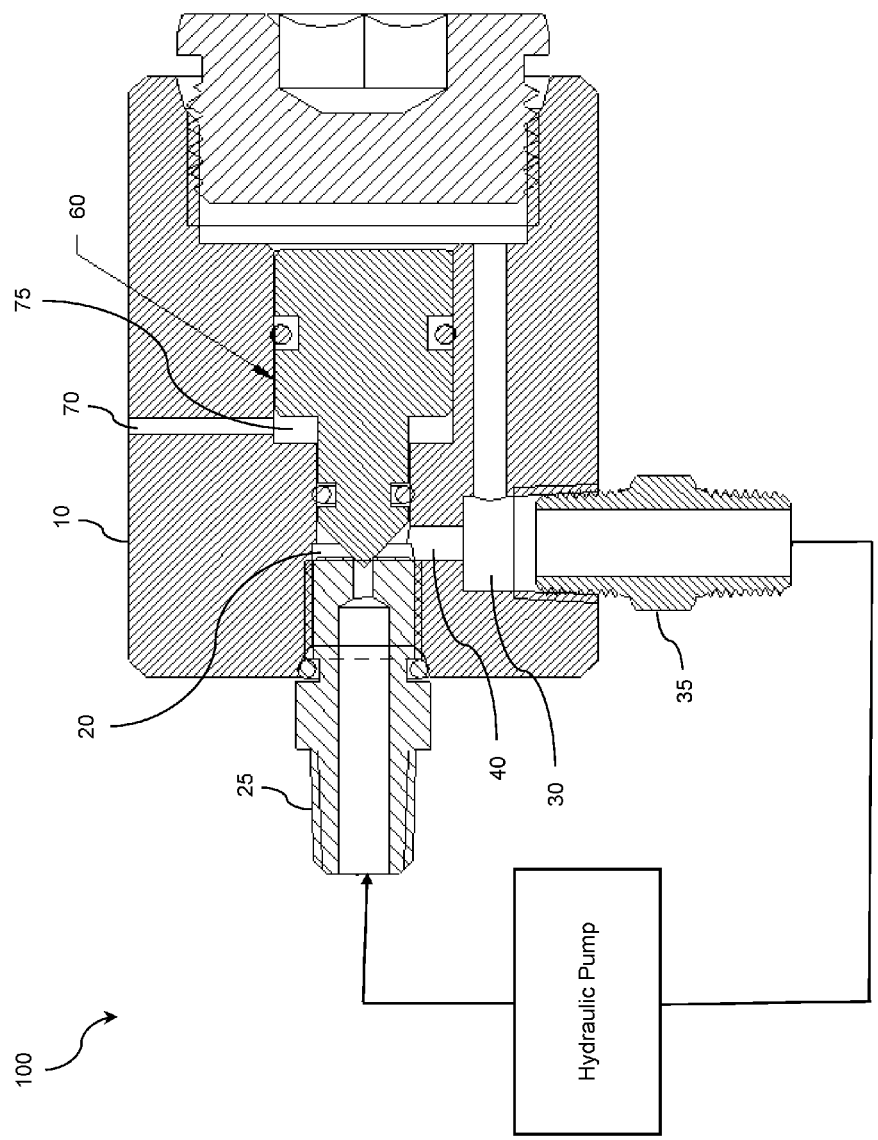
FIGS. 1A, 1B, 1C and 1D illustrate a cross-sectional view of a pressure stabilizing mechanism in accordance with the present invention.

The foregoing and other features will become more apparent upon reading of the following non-restrictive description of illustrative embodiments thereof, given by way of example only with reference to the accompanying drawings. Like numerals represent like features on the various drawings.

Various aspects of the present mechanism and pump generally address one or more of the problems related to stabilizing pressure of a fluid.

Reference is now made concurrently to FIGS. 1A, 1B, 1C, 1D and 2, which represent a cross-sectional view of a pressure stabilizing mechanism. The pressure stabilizing mechanism 100 is adapted for cooperating with a hydraulic pump, so as to stabilize the pressure variations in pumped fluids. For example, when a hydraulic pump is used for pumping municipal water, debit and pressure variations can be encountered during use. To reduce the negative effects of such debit and pressure fluctuations, the present pressure stabilizing mechanism may be used with the hydraulic pump to stabilize the pressure and debit of the pumped fluid by the hydraulic pump.

The pressure stabilizing mechanism 100 generally comprises a frame 10, a piston 60, and two seals 90 and 92. The frame 10 may be built in a single piece, or be formed of assembled pieces. The frame 10 may be built in any material suitable for withholding and stabilizing pressure and for receiving fluids. The frame 10 defines a piston chamber 75, a lower-pressure circuit 30 (shown in blue on FIG. 2) and a higher-pressure inlet 20.

The piston chamber 75 is shown on all Figures with the piston 60 inserted therein. The piston 60 of course occupies an important portion of the piston chamber, and as such the piston chamber 75 corresponds to the area covered by the piston 60 and the areas surrounding the piston (shown in white). The piston chamber 75 is composed of a first section of smaller circumference and a second section of larger circumference. The first section of the piston chamber 75 connects the lower-pressure circuit 30 and the higher-pressure inlet 20. The lower pressure circuit 30 further connects with the second section of the piston chamber, behind the movement of the piston 60. More particularly, the lower-pressure circuit 30 receives a low-pressure fluid from a lower-pressure inlet/outlet 35, and allows the low-pressure fluid to fill the area of the second section of the piston chamber 75 located opposite to the first section of the piston chamber. The higher-pressure inlet 20 receives the higher-pressure fluid.

Figure 1B:
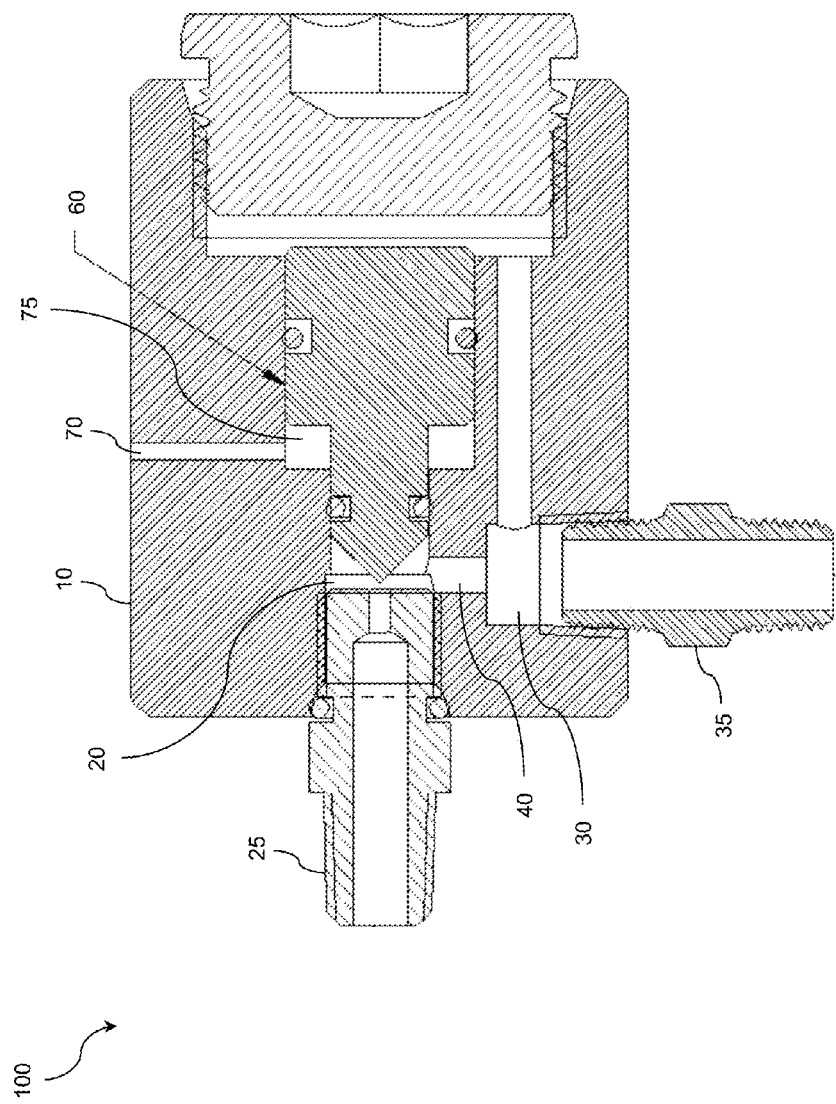
Figure 1C:
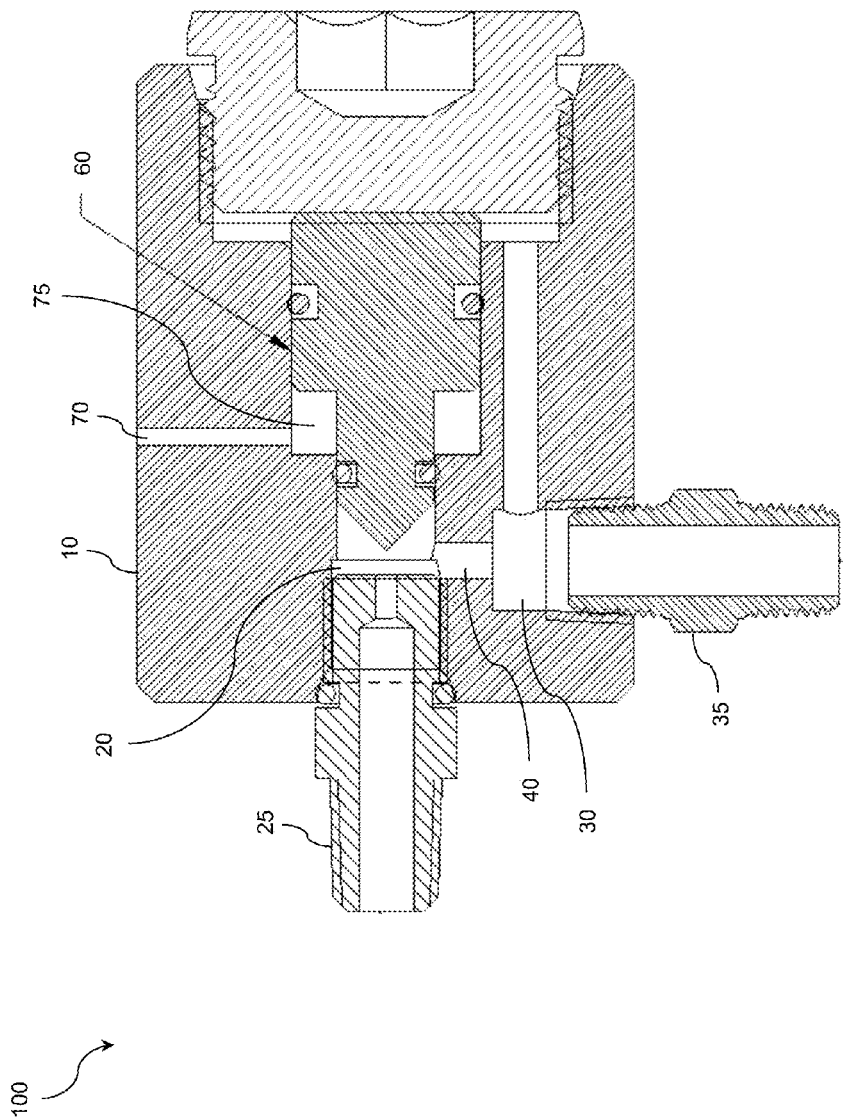
Figure 1D:
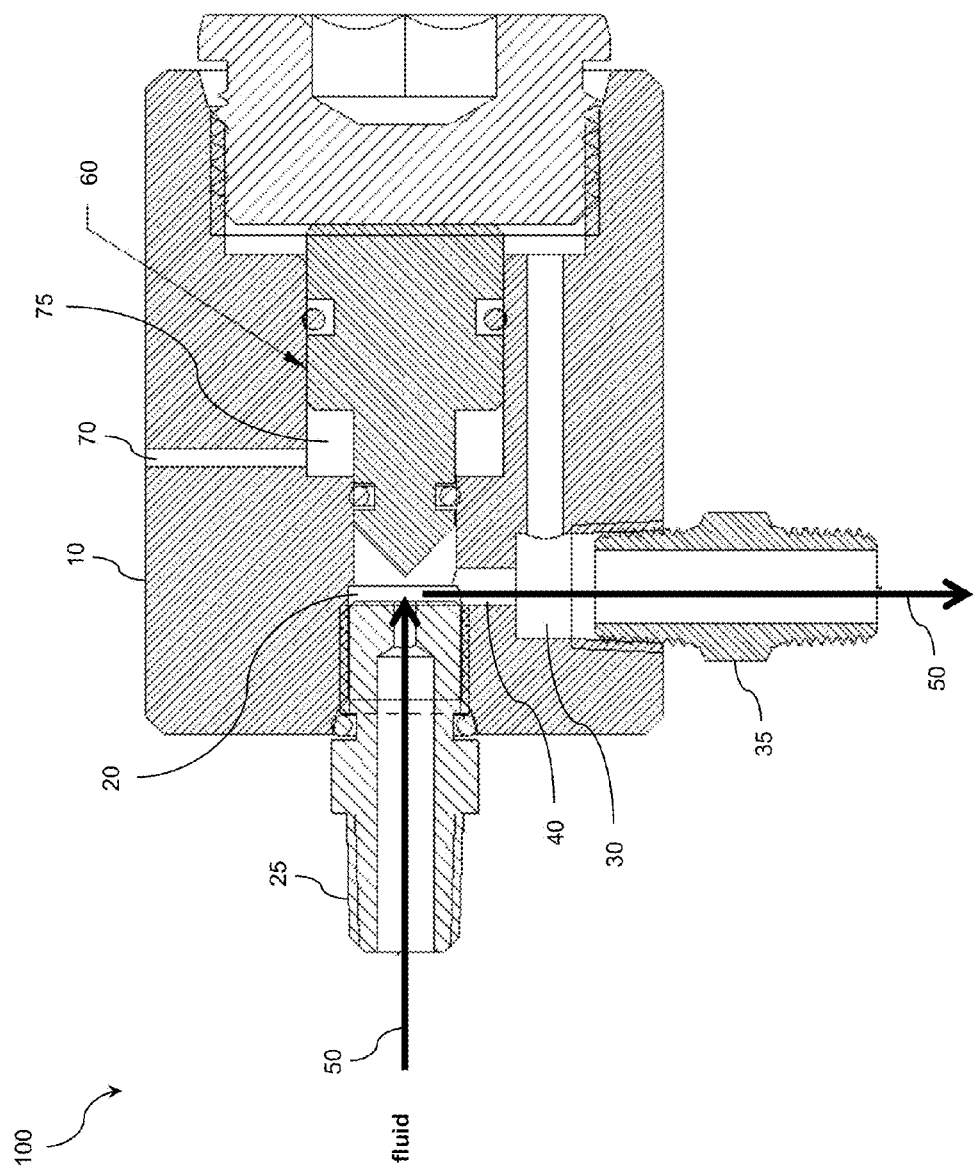

The piston 60 slidably moves in the piston chamber 75 between an open position (shown on FIGS. 1B-1D) and a closed position (FIG. 1A). The piston 60 has a first portion of smaller surface and a second portion of larger surface. A part of the length of the first portion of the piston slidably moves in the first section of the piston chamber. The second portion of the piston slidably moves in the second section of the piston chamber. The piston defines at an end of the first portion opposite to the second portion a tip. Examples of configuration of tips are shown on FIGS. 3A and 3B. As shown on FIG. 1A, when the piston 60 is in a closed position, the tip fully closes the higher-pressure inlet. Shown on FIGS. 1B-1D are examples of the piston 60 in an open position, where the tip is not abutted to the higher-pressure inlet 20, and flow of higher-pressure fluid is permitted. The piston also includes two seals 90 and 92. The first seal 90 seals the first portion of the piston in the first section of the piston chamber while allowing movement between the open and closed position. The second seal 92 seals the second portion of the piston in the second section of the piston chamber while allowing movement between the open and closed position.

The piston 60 slidably moves between the closed and open position upon relative variation between the lower-pressure fluid and larger surface in the second chamber with respect to the higher-pressure fluid and smaller surface in the first chamber of the piston chamber. Thus, the circumferences of the first and second sections of the piston chamber 75 and the surfaces of the first and second portions of the piston 60 are designed so as to operate for relative pressure differences. When the lower-pressure fluid is at expected pressure, the piston 60 is in the closed position. However, when the lower-pressure reduces, the combined effect of pressures on the corresponding surfaces actuates opening of the piston. The piston 60 then opens until the combined effect of pressure on the corresponding surfaces reaches a balance. When the lower-pressure fluid returns to its nominal expected pressure, the combined effect of pressure on the corresponding surfaces gradually moves the piston 60 in the closed position.

Appropriate connection means 25 (for instance a nozzle, pipes, hoses etc.) may be used to allow the higher-pressure fluid to flow from an outlet of the hydraulic pump to the higher-pressure inlet 20. Similarly, appropriate connection means may be used to connect the lower-pressure circuit 30 to the inlet of the hydraulic pump and to the lower-pressure fluid being pumped.

Two seals 90 and 92, such as for example O-rings are used to provide sealing between the piston 60 and the piston chamber. The use of seals such as O-rings also enables a more gradual movement of the piston 60 in the piston chamber. The contact points of the O-rings 90 and 92 respectively may correspond to surface S1 and surface S2. The compression of the O-rings shall be appropriately selected, to avoid preventing the movement of the piston 60 in the piston chamber. Experimental compression values between 0.005" and 0.02" have been found to be adequate.

The lower-pressure circuit 30 may include a channel 40 connected to both the higher-pressure inlet 20 and the lower-pressure fluid inlet/outlet 35. The channel 40 allows the higher-pressure fluid received from the higher-pressure inlet 20 to be transferred to the lower-pressure fluid inlet/outlet 30. FIG. 1D illustrates a flow 50 of the higher-pressure fluid from the higher-pressure inlet 20, the channel 40, and the lower-pressure fluid inlet/outlet 35.

Although not specifically represented in the Figures, the lower-pressure circuit may directly connect the higher-pressure inlet 20 and the lower-pressure fluid inlet/outlet 35 for fluid transfer there between. The position of the piston 60 in the higher-pressure fluid inlet 20 limits the quantity of higher-pressure fluid allowed in the lower-pressure circuit 30. In FIG. 1C, the tip of the piston 60 is no longer in contact with the higher-pressure fluid inlet 20, thus allowing a complete flow of higher-pressure fluid through the higher-pressure fluid inlet 20, in the lower-pressure circuit 30.

The pressure stabilizing mechanism 100 stabilizes the lower-pressure fluid pressure provided to an inlet of the hydraulic pump, by utilizing variation of the combined effect of pressures and surfaces between the first and second sections of the piston chamber to move the piston 60 in the piston chamber 75, so as to allow injection of higher-pressure fluid through the higher-pressure inlet to the lower-pressure fluid. Stabilizing the pressure of the lower-pressure fluid prevents cavitation of the pump. Thus, a small quantity of higher-pressure fluid of the pump is collected and injected through the higher-pressure inlet. When the pressure of the lower-pressure fluid is within normal operation parameters, the higher-pressure inlet is closed by the piston, and only the lower-pressure fluid is pumped by the hydraulic pump. However, when the pressure of the lower-pressure fluid falls below the required pressure, the variation in combined pressure and surface of the first and second sections of the piston chamber moves the piston 60 in the open position so as to allow the higher-pressure fluid to be injected within the lower-pressure fluid in the lower-pressure circuit, and be pumped by the hydraulic pump through the lower-pressure inlet/outlet.

Figure 2:
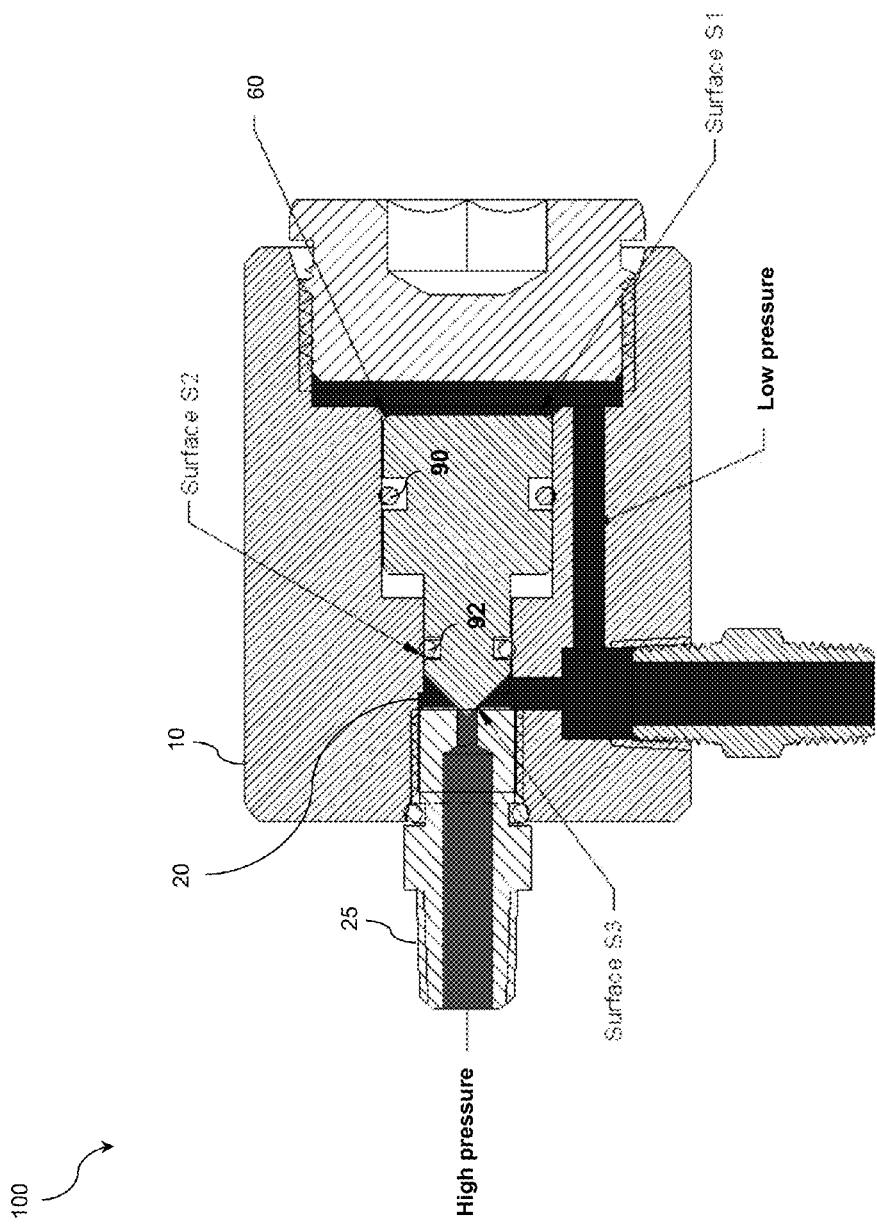
FIG. 2 illustrates differences of pressure in the pressure stabilizing mechanism of FIGS. 1A-D.

Reference is now made to FIG. 2, which illustrates the movement of the piston 60 based on the combined variation of pressure and surface in the first and second sections of the piston chamber.

The tip of the piston 60 is in contact with the higher-pressure inlet, thus receives the pressure exercised by the higher-pressure fluid. The other extremity of the piston 60 is in contact with the lower-pressure circuit, thus with the lower-pressure fluid, which corresponds to the lower-pressure fluid pumped at the inlet of the hydraulic pump (low pressure).

When the lower-pressure fluid falls below a minimum required pressure, the combined effect of the pressure and surface between the first and second sections of the piston chamber pushes the piston 60 so as to allow injection of higher-pressure fluid in the lower-pressure circuit, thereby stabilizing the pressure of the lower-pressure fluid present at an inlet of the pump.

The pressure-stabilizing mechanism must be designed so as to function within a specific range of pressures. The parameters which must be considered in the design of the pressure-stabilizing mechanism include the pressure of the higher-pressure fluid, i.e. the fluid pressure at an outlet of the pump with which the pressure-stabilizing mechanism is to be used, the nominal pressure at the low-pressure inlet/outlet, and the surface of first and second portions of the piston. The effect of the seals should also be considered, to ensure relative smooth movement of the piston 60 between the closed and open positions. Based on these parameters, the physical dimensions of the piston chamber and piston can be determined.

The following equation sets the relations between the higher-pressure fluid pressure, the lower-pressure fluid pressure, and dimensions of the first and second sections of the piston, along with the size of the higher-pressure inlet:

$$P_1*(S_1-(S_2-S_3))=P_2*S_3 \quad (1)$$

where:
P1 is the required pressure of the lower-pressure fluid;
P2 is the pressure of the higher-pressure fluid;
S1 is the cross-sectional surface of the second portion of the piston 60 (diameter D1);
S2 is the cross-sectional surface of the first portion of the piston 60 (diameter D2); and
S3 is the open surface of higher-pressure inlet.

The piston 60 is designed with surfaces S1, S2 and S3. If the piston first and second portions are circular, the surfaces may be calculated with the following equation:

$$Si = \frac{\pi*Di^2}{4} \quad (2)$$

Combining (1) and (2) gives the following equation:

$$P_1*\left(\frac{\pi*D1^2}{4}-\left(\frac{\pi*D2^2}{4}-\frac{\pi*D3^2}{4}\right)\right)=P_2*\left(\frac{\pi*D3^2}{4}\right) \quad (3)$$

After simplification of (3), the following equation applies:

$$P_1 = P_2 * \frac{D_3^2}{D_1^2 - D_2^2 + D_3^2} \quad (4)$$

By knowing the pressure of the fluid at an outlet of the pump, herein referred as the higher-pressure fluid pressure, and the minimum required inlet pressure, herein referred as the lower-pressure fluid pressure, it is possible to design the present pressure-stabilizing mechanism, and to select appropriate dimensions for the first and second sections of the piston (with the seals), and the shape of the tip of the piston.

Following are exemplary values for D1, D2, D3, P2; and the corresponding resulting minimal pressure values for P1.

| D1 (po) | 0.663 | |
|---|---|---|
| D2 (po) | 0.341 | |
| D3 (po) | 0.046 | |
| d | $(D3)^2/(D1^2 - D2^2 + D3^2)$ | 0.006502686 |

| P2 (b/po$^2$) | P1 (b/po$^2$) |
|---|---|
| 1200 | 8 |
| 2000 | 13 |
| 2500 | 16 |
| 3000 | 20 |
| 3500 | 23 |
| 4000 | 26 |
| 5000 | 33 |

Coming back to FIG. 1A, the frame 10 may further include a security hole 70. The security hole 70 may be used to detect a leak of fluid. The leak of fluid may occur for example when the pressure stabilizing mechanism 100 comprises O-rings, and one of the O-ring is damaged or broken. The security hole 70 may also be used to evacuate condensed air located in the piston chamber. When the piston 60 moves between the positions illustrated in FIGS. 1A and 1C, the volume of the piston chamber not occupied by the piston 60 (but occupied by air) varies. Without the security hole 70, condensed air (for example in the configuration represented in FIG. 1A) may exert a pressure on the piston 60 and prevent it from operating appropriately.

Reference is now made concurrently to FIGS. 1A, 3A and 3B. FIGS. 3A and 3B represent two different shapes of tips for the piston 60 represented in FIGS. 1A-1D.

FIG. 3A represents the tip of the piston 60 with a plane extremity 61 for sealing the extremity of the higher-pressure inlet 20, and preventing higher-pressure fluid to flow in the lower pressure circuit 30. FIG. 3B represents the piston 60 with a peaked extremity tip 62. Both shapes of the tip of the piston 60 may be used for the pressure stabilizing mechanism 100. However, the shape with the peaked extremity 62 provides more accuracy in controlling the amount of higher-pressure fluid flowing through the higher-pressure inlet 20.

The shapes and sizes of the higher-pressure fluid inlet 20, lower-pressure circuit 30, connections means 25 and 35, channel 40, piston 60, piston chamber 75, security hole 70, as represented in the Figures, are for illustrations purposes only. They may differ from the shapes and sizes represented in FIGS. 1A and 2 in other embodiments of the pressure stabilizing mechanism 100. For example, although exemplary calculations have been provided for a piston with circular first and second portions, the present pressure stabilizing mechanism 100 is not limited to such shape. The piston chamber 75 and piston could have various complementary shapes.

Reference is now made to FIG. 4, which illustrates a schematic example of the pressure stabilizing mechanism 100 connected to a pump 200. In FIG. 4, the pressure stabilizing mechanism 100 is directly connected to the pump 200, by means of screws shown on the Figure. The pressure stabilizing mechanism 100 can be connected directly to the pump 200 as shown on FIG. 4, be separate from the pump 200 and connected by means of hoses, fittings and gaskets. In another alternative not shown, the pressure stabilizing mechanism 100 could also be incorporated in the pump 200 when built.

Although the present pressure stabilizing mechanism and pump have been described in the foregoing description by way of illustrative embodiments thereof, these embodiments can be modified at will, within the scope of the appended claims without departing from the spirit and nature of the appended claims.

What is claimed is:

1. A pressure stabilizing system for a hydraulic pump, the hydraulic pump comprising a lower-pressure input for receiving an input fluid at a first pressure and a higher-pressure output for outputting an output fluid at a second pressure, the first pressure being lower than the second pressure, the pressure stabilizing system comprising:
   a frame defining: a piston chamber, a lower-pressure circuit, a lower-pressure inlet/outlet and a higher-pressure inlet, the piston chamber having a first section and a second section, a circumference of the first section of the piston chamber being smaller than a circumference of the second section of the piston chamber, the first section of the piston chamber connecting the lower-pressure circuit and the higher-pressure inlet, the lower-pressure circuit further connecting with the second section of the piston chamber, the lower-pressure circuit being connected to the lower-pressure input of the pump through the lower-pressure inlet/outlet and receiving a lower-pressure fluid, the higher-pressure inlet being connected to the higher-pressure output of the pump and receiving a higher-pressure fluid from the higher-pressure output of the pump, a pressure of the lower-pressure fluid being lower than a pressure of the higher-pressure fluid, the pressure of the lower-pressure fluid being substantially equal to the pressure of the input fluid received by the lower-pressure input of the pump, the pressure of the higher-pressure fluid being substantially equal to the pressure of the output fluid outputted by the higher-pressure output of the pump;

a piston slidably movable in the piston chamber between an open position and a closed position, the piston having a first portion with a first surface and a second portion with a second surface, the first surface being smaller than the second surface, a length of the first portion of the piston slidably moving in the first section of the piston chamber, the second portion of the piston slidably moving in the second section of the piston chamber, the piston defining at an end of the first portion opposite to the second portion a tip, when the piston is in a closed position the tip fully closes the higher-pressure inlet and when the piston is in an open position the tip opens the higher-pressure inlet, the piston slidably moving between the closed and open position upon relative pressure variation between the lower-pressure fluid and second surface in the second chamber with respect to the higher-pressure fluid and first surface in the first chamber of the piston chamber;

a first seal for sealing the first portion of the piston in the first section of the piston chamber while allowing movement between the open and closed position;

a second seal for sealing the second portion of the piston in the second section of the piston chamber while allowing movement between the open and closed position; and the first and second seals forming there between a buffer zone substantially free of fluid;

wherein the lower-pressure circuit receives the lower-pressure fluid and combines the lower-pressure fluid with the higher-pressure fluid received at the higher-pressure inlet when the piston is in the open position, the lower-pressure fluid combined with the higher-pressure fluid being outputted via the lower-pressure inlet/outlet to the lower-pressure input of the pump.

2. The pressure stabilizing system of claim 1, wherein the first and second sections of the piston chamber are circular.

3. The pressure stabilizing system of claim 2, wherein the first and second portions of the piston are circular.

4. The pressure stabilizing system of claim 3, wherein the first and second seals are O-rings.

5. The pressure stabilizing system of claim 1, wherein the higher-pressure inlet is adapted to receive connection means for connecting the higher-pressure inlet with the higher-pressure output of the pump, the connection means comprising at least one of the following: a nozzle, a pipe, and a hose.

6. The pressure stabilizing system of claim 1, wherein a difference of pressure between the higher-pressure fluid received at the higher-pressure inlet and the lower-pressure fluid in the lower-pressure circuit actuates movement of the piston between the open and closed position.

7. The pressure stabilizing system of claim 1, wherein the combined lower-pressure fluid and higher-pressure fluid is outputted by the lower-pressure inlet/outlet to the lower-pressure input of the hydraulic pump to prevent cavitation of the hydraulic pump.

8. The pressure stabilizing system of claim 1, wherein the lower-pressure inlet/outlet is adapted to receive connection means for connecting the lower-pressure inlet/outlet with the lower-pressure input of the pump, the connection means comprising at least one of the following: a nozzle, a pipe, and a hose.

9. The pressure stabilizing system of claim 1, wherein the pressure stabilizing mechanism is connected directly to the hydraulic pump.

\* \* \* \* \*